United States Patent

[11] 3,592,226

| [72] | Inventor | John A. Graham, Jr. |
| --- | --- | --- |
| | | Toledo, Ohio |
| [21] | Appl No | 691,006 |
| [22] | Filed | Dec. 15, 1967 |
| [45] | Patented | July 13, 1971 |
| [73] | Assignee | Hadley Manufacturing Company |
| | | Toledo, Ohio |

[54] PRESSURE CONTROL APPARATUS
14 Claims, 6 Drawing Figs.

[52] U.S. Cl. .................................................. 137/557,
137/596.2, 137/637.2, 137/625.68
[51] Int. Cl. ........................................................ F16k 37/00,
F16k 11/10, F16k 11/07
[50] Field of Search .......................................... 137/596.2,
557, 637.2, 625.26, 625.68; 251/95, 100, 321,
346, 351, 26

[56] References Cited
UNITED STATES PATENTS
| 967,772 | 8/1910 | Hohman | 251/100 |
| 1,463,735 | 7/1923 | Varrieur | 251/100 |
| 2,206,957 | 7/1940 | Hose | 251/26 |
| 2,630,326 | 3/1953 | Bryant | 137/625.26 |
| 2,638,108 | 5/1953 | Williams et al. | 137/625.26 X |
| 3,107,691 | 10/1963 | Schwarz | 251/100 X |
| 3,117,595 | 1/1964 | Broecker et al. | 137/637.2 |
| 3,233,631 | 2/1966 | Cornelius | 137/637.2 |

Primary Examiner—Henry T. Klinksiek
Attorney—Myron E. Click

ABSTRACT: A novel system which utilizes pressure control apparatus comprising main valve chamber means having an entry port adapted to be connected to a supply source of fluid under pressure and an exit port adapted to be connected to a pressurized fluid system to be controlled. A blocking element is located in the chamber. The blocking element may be selectively manipulated to permit fluid flow between the entry and exit ports. Secondary valve means are provided with communication between the exit port and the secondary valve means. Means are disclosed for manipulating the secondary valve means to reduce pressure in the fluid system being controlled.

INVENTOR.
JOHN A. GRAHAM, JR.

BY

ATTORNEY

INVENTOR.
JOHN A. GRAHAM, JR.

BY

ATTORNEY

PRESSURE CONTROL APPARATUS

This invention relates to pressure control apparatus generally and is particularly useful in and for the control of a system whereby an operator of a vehicle may adjust the operation of a load-leveling system under various conditions without moving from the driver's seat.

It has been found desirable to provide transportation vehicles with pneumatic means to compensate for varying load conditions which may affect the efficiency and safety of operation of the vehicle. This is particularly evident in the case of passenger cars, station wagons and light trucks which are subject to disparate load conditions or varying road conditions. In the prior art, several methods have been devised which utilize heavy duty shock absorbers, load-leveling suspension systems, etc., to effect some equalization of the load. Some of these systems are automatic in operation but utilize complex valves and controls which are expensive to manufacture and to care for if the system is to be properly maintained. Other systems require filling of air bags and shock absorbers at service stations. These systems are regulated by bleeding with a pin when the load is decreased, with no opportunity to accurately judge the amount of air to be removed for the new conditions. When load is again added, a trip to the service station is again required.

The present invention contemplates a load-leveling system for automotive vehicles which includes a source of pressurized fluid to be mounted on the vehicle and fluid-operated load-leveling means for the vehicle. Primary valve apparatus connects the fluid source and the leveling means. Secondary valve apparatus is provided for bleeding fluid from the leveling means. Pressure-indicating means responsive to pressure in the leveling means allows accurate adjustment of the system. A third valve means may be included to permit temporary connection of an outside pressure source to the system, the flow of fluid to the leveling means from the outside source being controlled by the primary valve apparatus. Alternatively, the third valve means may be used to permit connection of an extension or distribution hose or conduit to the pressure source side of the primary valve. Thus, air under pressure would be available via the extension hose or conduit for inflating tires, air mattresses and toys, etc., from the vehicle-equipped pressurized fluid source, and to provide a portable air supply. The system advantageously uses a compressor for the pressurized fluid source, the compressor being operated by the motive means of the vehicle.

It is thus an object of this invention to provide an improved load-leveling system.

It is a further object of this invention to provide improved pressure control apparatus.

A still further object of this invention is to provide improved pressure control apparatus which is inexpensive to manufacture and maintain and is very reliable. The apparatus permitting control of a load-leveling system from the driver's seat of a vehicle.

Another object of this invention is to provide improved control apparatus for a load-leveling system and an improved system, both of which are readily controlled by the driver of a vehicle while in transit to effect three functions; to increase the pressure in the system, to lock the system at a desired pressure, and to quickly bleed the system to reduce pressure.

In a preferred embodiment the invention features pressure control apparatus comprising a main valve body having a longitudinally extending chamber formed therein and further having entry and exit ports for the chamber formed in the body. One of the ports is preferably located at one end of the chamber. A main valve element is disposed for reciprocable movement in the chamber to selectively block and permit flow between the ports. The main valve element extends out of the other end of the chamber and has a conduit formed therein providing communication between the exit port and the outwardly extending end of the main valve element. Secondary valve means are utilized to control fluid flow in the conduit.

The main valve chamber is advantageously substantially cylindrical, the port formed at the end of the chamber being also cylindrical and having a smaller diameter than the diameter of the chamber. The main valve element has a first substantially cylindrical section adapted to reciprocate into and out of the chamber end port and a second cylindrical section adapted to reciprocate in the chamber. The first section of the valve element may carry sealing means to contact the wall of the chamber end port and block flow therethrough. The second section of the valve element may carry second sealing means intermediate the other port and the other end of the chamber to contact the wall of the chamber and prevent leakage.

Stop means for limiting reciprocable travel of the main valve element includes a stop member extending inwardly into the main valve chamber. The first section of the main valve element has a stop surface formed thereon registering with the stop member and limiting outward travel of the main valve member. The stop member also registers with the second section of the main valve element to limit inward travel of the main valve element. The first section of the main valve element advantageously has a circumferential groove formed therein to receive the stop member. Thus, when the main valve element is rotated the stop member enters the groove and prevents reciprocation of the main valve element in the chamber. The stop member and the circumferential groove are advantageously located so that the main valve element is locked in a chamber end port sealing position.

The secondary valve means preferably comprises a secondary valve chamber formed in the outwardly extending end of the main valve element. Bleed passage means for the secondary chamber is centrally located at the end of the main valve element. A secondary valve element disposed within the secondary chamber is disposed to control flow from the conduit. The secondary valve element may have an actuator shaft extending through the bleed passage. Biasing means may be disposed within the secondary valve chamber to yieldingly urge the secondary valve element into a flow-blocking position.

A knob may be mounted on the outwardly extending end of the main valve element. The knob has a central opening formed therein to permit the actuator shaft to extend therethrough. Radially extending flange means on the knob permit finger holding of the knob while applying pressure to the actuator shaft with the thumb.

Pressure means mounted on a support frame or casing in view of the driver, and responsive to pressure in the exit port which is connected to the load-leveling means permits accurate adjustment to the conditions at the moment.

Other objects, advantages and features will become apparent when the following description is taken in conjunction with the accompanying drawings, in which.

Figure 1:
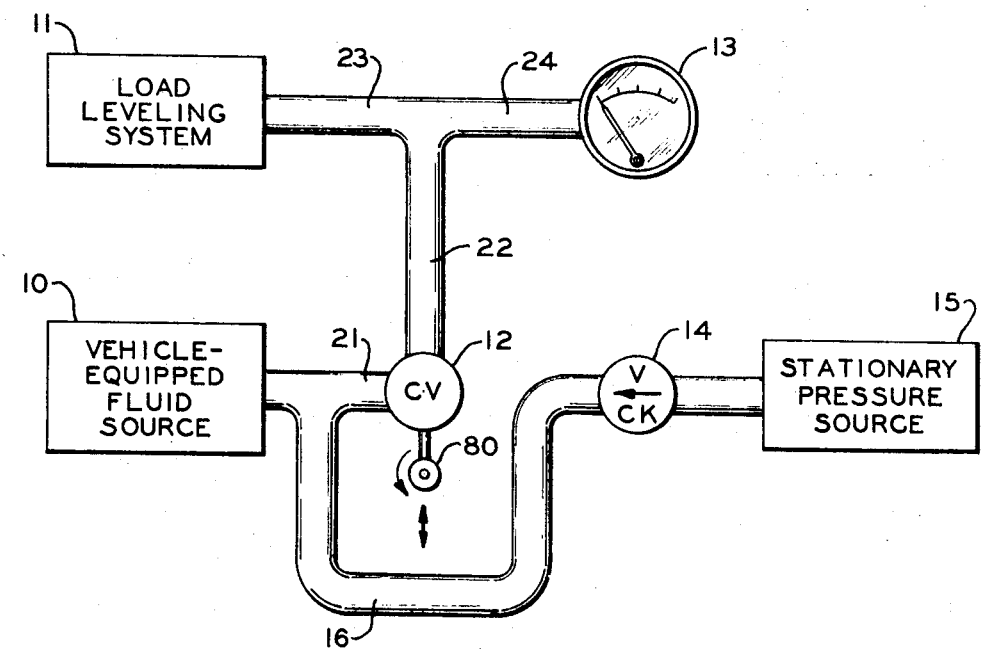
FIG. 1 is a block diagram of a system illustrating the teachings of this invention.

Referring to the drawings there is illustrated in FIG. 1 a diagrammatic layout of the teachings of this invention as embodied in a system. A pressurized fluid source 10, which is preferably a compressor operated by the motive means of the vehicle, is connected to a load-leveling system 11 by an inlet passage 21, control valve apparatus 12 and outlet passages 22, 23. A pressure-indicating means such as gauge 13 is connected to the load-leveling system 11 via passages 24, 23 and to the exit port of control apparatus 12 via outlet passage 22 to permit an accurate reading of the pressure in the system and therefore an accurate adjustment of pressure by the use of the control valve apparatus 12. Valve means 14, which may be a check valve, permits temporary connection of an outside or stationary pressure source, such as a compressor available at a service station, to the entry port of the control valve apparatus 12 via inlet passage 21. The control valve apparatus 12 therefore controls flow from both sources 10 and 15. The valve 14 may also or alternatively be used to connect the extension hose discussed hereinbefore for inflating tires, air mattresses or toys, or to pressurize water systems in travel trailers, campers and the like.

In some instances it may be desirable to provide an air storage tank in addition to or as an alternative to a compressor which is the preferred source for pressurized fluid. If an air storage tank is utilized for source 10, then the supply of air may be replenished as required by connecting a temporary pressure source 15 through check valve 14 to the air storage tank.

Figure 2:
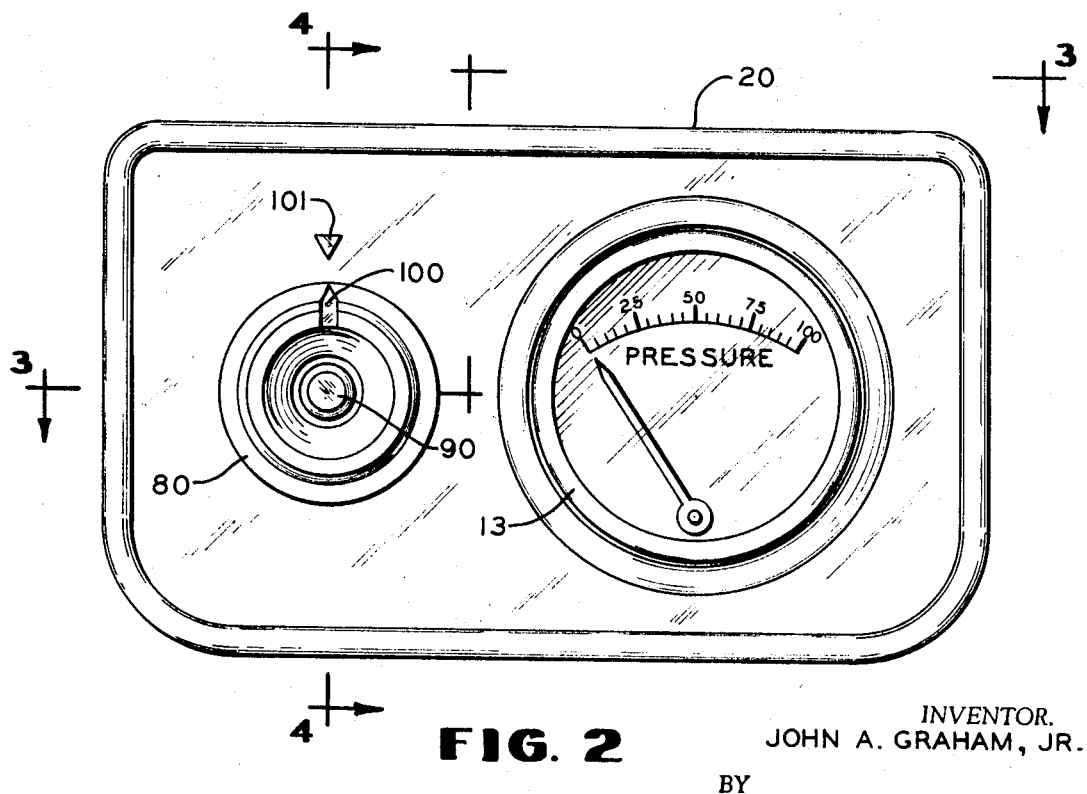
FIG. 2 is a front elevational view of pressure control apparatus embodying the teachings of this invention.
Figure 3:
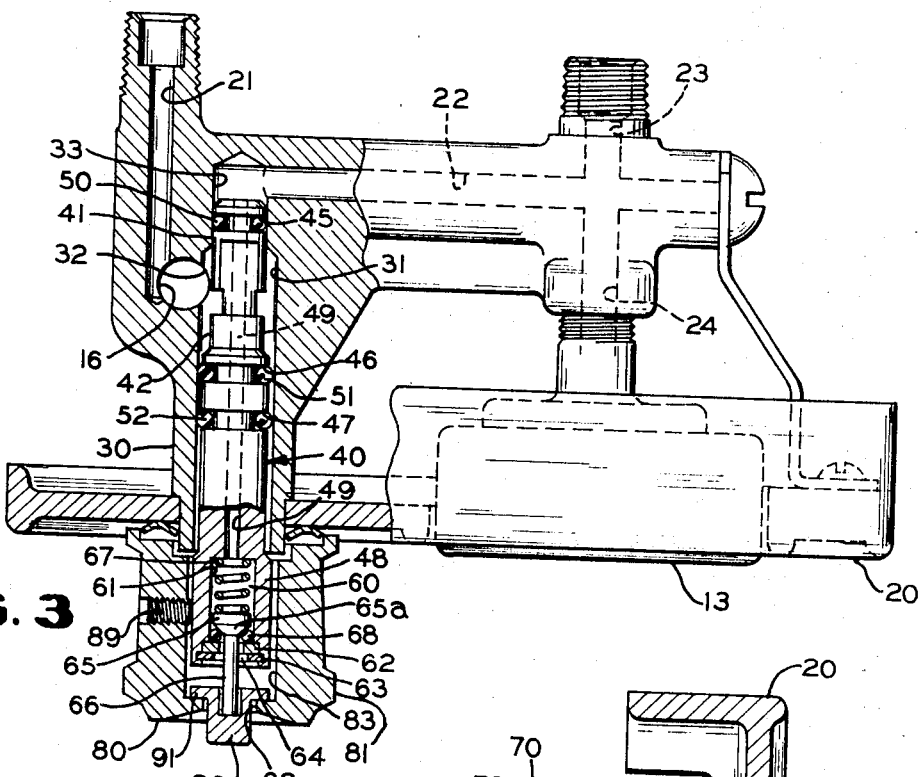
FIG. 3 is an enlarged plan view of the apparatus illustrated in FIG. 2, taken partially in section along lines 3-3 of FIG. 2.
Figure 4:
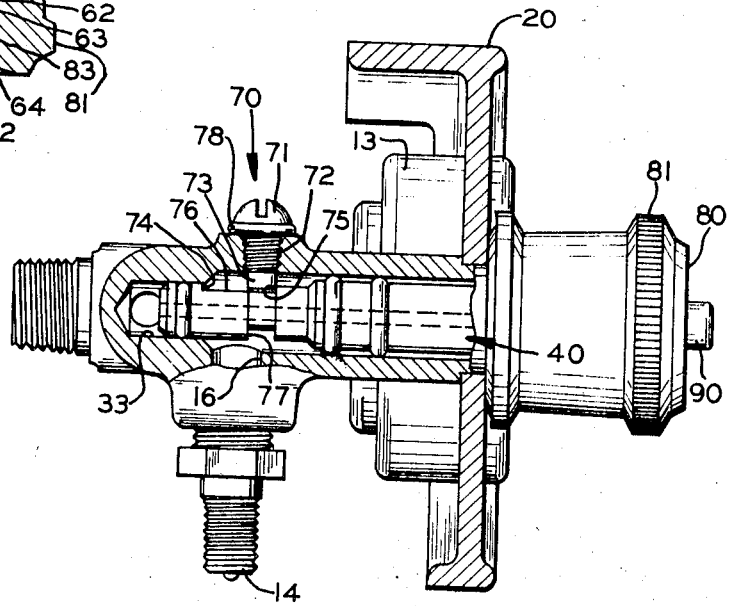
FIG. 4 is an enlarged side view of the apparatus illustrated in FIG. 2, with a section taken along lines 4-4 in FIG. 2.

Referring to FIGS. 2, 3 and 4, there is illustrated pressure control apparatus in a preferred embodiment mounted upon a support frame or casing 20 which may be affixed to the dash of the vehicle utilizing the system. The casing 20 also supports and protects gauge 13.

Referring particularly now to FIG. 3 there is illustrated a main valve body 30 having a longitudinally extending chamber 31 formed therein and further having an entry port 32 and an exit port 33 formed in the body 30. One of the ports, in this embodiment the exit port 33, is located at one end of the chamber 31.

A main valve or blocking element 40 is disposed for reciprocable movement in the chamber 31 to selectively block or permit flow between the ports 32, 33. The main valve element extends out of the outer end of the chamber and has a conduit 49 formed axially through said main valve element 40 extending between the exit port 33 and the outwardly extending end 48 of the main valve element 40. Secondary valve means 60 is connected to control fluid flow in the conduit 49.

The main valve chamber 31 is substantially cylindrical. The exit port 33 at the end of the chamber is also substantially cylindrical, the diameter of the exit port 33 being smaller than the diameter of the chamber 31.

Figure 5:
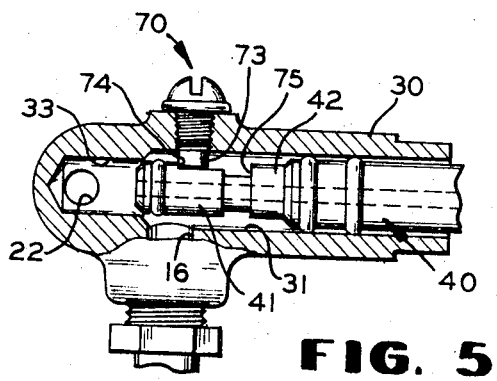
FIG. 5 is a partial view of the apparatus of FIG. 4 illustrating a valve element in an alternate position.

The main valve element 40 has a substantially cylindrical first section 41 adapted to reciprocate into and out of the exit port 33 at the end of the chamber 31 and a second cylindrical section 42 adapted to reciprocate in the chamber 31. The smaller section 41 will then permit flow between ports 32, 33 when retracted into chamber 31 (as shown in FIG. 5).

The first section 41 of the valve element 40 carries a first sealing means such as O-ring 50, held in position in circumferential groove 45, to contact the wall of the exit port 33 to block flow therethrough when section 41 is reciprocated into exit port 33. The second section 42 of the valve element carries second sealing means such as O-rings 51, 52 carried on the second section in circumferential grooves 46, 47, respectively, to contact the wall of the chamber 31 and prevent leakage.

Referring now to FIG. 4 it can be seen that the apparatus includes a stop means, generally indicated at 70, for limiting reciprocable travel of the main valve element 40. A stop member 73 extends inwardly into chamber 31, and in the embodiment shown is an extension of a screw 71 which is inserted into a threaded aperture 72 formed in main valve body 30. A gasket 78 prevents leakage around the head of screw 71.

A stop surface 74, formed on the first section 41 of the main valve element, registers with the stop member 73 and limits outward travel of the main valve member 40. A second stop surface 75, formed by the larger second section 41 of the main valve element 40, registers with stop member 73 and limits inward travel of member 40. A portion of the cylindrical first section 41 is machined away to provide a flat surface 76 extending between stop surfaces 74 and 75 to permit registration of stop member 73 with and to permit travel of the main valve element between stop surfaces 74 and 75.

A circumferentially or perimetrically extending groove 77 is formed in the first section 41 of the main valve element 40 to receive the stop member 73 when the main valve element 40 is rotated. This locks the lateral position of the main valve element 40 and prevents reciprocation of the main valve element 40 in the chamber 31. The stop member 73 and the circumferentially extending groove 77 are preferably located so that the main valve element is locked in the exit port sealing position.

Referring again to FIG. 3 it will be noted that the secondary valve means indicated generally at 60 comprises a secondary valve chamber 61 formed in the outwardly extending end 48 of the main valve element 40. An enclosure disc 62 and a lock washer 63, holding the disc 62 in place, closes the end of chamber 61 and defines a bleed passage 64 which is concentrically located in the end 48 of the main valve means 40. A secondary valve element 65 is disposed within the secondary chamber 61 and is adapted to control flow from the conduit 49 through the bleed passage 64.

A spring 67 provides biasing means for yieldingly urging the secondary valve element 65 into a flow-blocking position. The element 65 has an actuator shaft 66 extending through the bleed passage 64. A sealing element 68 in the form of an O-ring 68 prevents leakage of air along the wall of chamber 61 and cooperates with the truncated conical surface 65a of the secondary valve element 65 to form a seat and seal arrangement which prevents flow through bleed passage 64 and thus also prevents flow in conduit 49.

A knob 80 has a cavity 83 formed therein to receive the outwardly extending end 48 of the main valve element 40. A threaded aperture 89 is provided for the insertion of a setscrew to maintain the knob in a predetermined mounted position on the end 48 of the main valve element 40. The knob further has a central opening 82 formed therein, permitting the actuator shaft 66, or an extension of the actuator shaft 66 such as actuator button 90 mounted on the actuator shaft 66, to extend therethrough. The actuator button 90 has a radially extending flange 91. The flange 91 seats against the walls of cavity 83 surrounding central opening 82 under pressure from the spring 67. The knob 80 has radially extending flange means 81 to permit finger holding of the knob 80 while applying pressure to the actuator shaft 66, or an extension thereof such as button 90, with the thumb.

Referring to FIG. 5 the main valve element 40 is illustrated in a position permitting flow between ports 32, 33. It has been moved to its extreme right hand position so that stop surface 74 abuts stop means 73. Flow is permitted (whether fluid is received from pressurized fluid source 10 or a temporary pressure source 15) through inlet passage 21, entry port 32, exit port 33, and outlet passage 22. From the outlet passage 22 the fluid proceeds through passage 23 to the load-leveling system 11 and to the pressure indicating means 13 through passage 24.

After a desired pressure is attained in the load leveling system 11, as determined by the desired reading on gauge 13, the main valve element 40 is reciprocated to the left (as shown in FIG. 4) so that the second stop surface 75 on the second section 42 abuts the stop means 73. The sealing means 50 is thus inserted into exit port 33 and flow from inlet passage 21 through entry port 32 to exit port 33 and outlet passage 22 is blocked.

Figure 6:
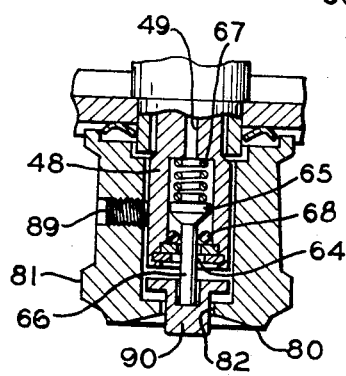
FIG. 6 is a partial view of the apparatus illustrated in FIG. 3 showing operation of secondary valve means.

To lock the main valve element 40 in this position the knob 80 is rotated so that the stop means 73 is received by groove 77 preventing reciprocable movement of main valve element 40. If too much pressure has been placed in load-leveling system 11, or if the load has changed so that the pressure now in system 11 is too great, the secondary valve apparatus 60 is utilized. The actuator extension button 90 is pressed moving the button 90, the actuator shaft 66, the valve element 65, and the spring 67 into the position illustrated in FIG. 6. This permits flow of fluid from the load-leveling means 11, the outlet passage 22 and the exit port 33 through conduit 49, chamber 61, bleed passage 64, and central opening 82, to the atmosphere. The button 90 is held in the depressed position until the desired pressure, as indicated by gauge 13, is achieved in load-leveling system 11.

Referring to FIG. 2 it will be noted that indicia 100 on knob 80 and indicia 101 on the frame or casing may be used to mark the position of surface 76 in chamber 31. That is, when indicia 100, 101 are brought into registration by rotating knob 80, the surface 76 is in the position shown in FIG. 4 and the main valve element 40 may be reciprocated in chamber 31. With the element 40 pushed all the way in, the indicia 100, 101 may be taken out of registration by rotating knob 80. The groove 77 on section 41 of member 40 will then receive stop member 73 and member 40 will be locked against lateral or reciprocal movement.

Referring to FIG. 4 it will be noted that check valve 14 is secured to the bottom of main valve body 30. Passage 16 connects valve 14 and any outside source of pressurized fluid to inlet passage 21 and, in FIG. 3, forms the entry port 32 connecting passage 21 to chamber 31. Alternatively, the valve 14 may be used to supply an extension hose connected thereto, for the purposes discussed hereinbefore.

Pressure control apparatus has thus been illustrated which may be broadly described as comprising main valve chamber means having an entry port adapted to be connected to a supply source of fluid under pressure and an exit port adapted to be connected to a pressurized fluid system to be controlled. A blocking element is located in the chamber and may be selectively manipulated to permit fluid flow between the entry and exit ports. Secondary valve means are provided to bleed pressure from the exit port and/or the leveling system.

Main valve chamber means comprises a valve body having a longitudinally extending bore formed therein. One of the ports is located at one end of the bore, the blocking element being selectively reciprocated in the bore to block and to prevent flow between the ports. A conduit is formed in the blocking element to provide communication between the secondary valve means and the exit port or the system being controlled. The blocking element extends out of the other end of the bore to provide an accessible portion for manipulation. Longitudinally spaced stop surfaces cooperate with a stop member to limit reciprocable travel of the blocking means. The secondary valve means comprises a secondary valve chamber formed in the blocking element, a bleed passage from the secondary chamber also being formed therein. A secondary valve element selectively controls flow through the bleed passage.

The system thus described herein utilizes the pressure control apparatus to provide a novel system which is inexpensive, reliable and operable from the driver's seat in a vehicle. While the drawings and description illustrate a practical embodiment of my invention, I do not limit myself to the details shown, since modification may be made without departing from the spirit and scope of the invention.

I claim:

1. Pressure control apparatus for connecting a supply source of fluid under pressure to a closed system to be pressurized by said supply source and controlling the pressure in the closed system comprising main valve chamber means having an entry port connected to the supply source of fluid under pressure and an exit port connected to the pressurized fluid system to be controlled, a blocking element located in said chamber, means for selectively manipulating said element to block and to permit fluid flow from said entry port to said exit port, secondary valve means connected to said main valve chamber means, means providing communication from said exit port and the closed system to said secondary valve means, and means for manipulating said secondary valve means to connect said exit port to the atmosphere through said communication means to reduce pressure at said exit port and in the closed fluid system being controlled.

2. Apparatus as defined in claim 1 which further includes pressure indicating means responsive to pressure at said exit port and in the closed system to enable accurate adjustment of pressure in the system via alternate and simultaneous manipulation of said blocking element and said secondary valve means.

3. Apparatus as defined in claim 1 in which said main valve chamber comprises a valve body having a longitudinally extending bore formed therein in which said blocking element may be selectively reciprocated to block and to permit flow between said ports, said blocking element extending out of one end of said bore to provide an accessible portion for manipulation, said communication means between said exit port and said secondary valve means being formed at least partially through said blocking element.

4. Apparatus as defined in claim 3 which further includes stop means carried by one of said blocking element and said valve chamber means, and in which the other of said blocking element and said valve chamber means has longitudinally spaced stop surfaces formed thereon to cooperate with said stop means to limit reciprocable travel of said blocking element, one of said stop surfaces preventing removal of said blocking element from said bore, the other of said stop surfaces enabling said blocking element to be held in a flow-blocking position.

5. Apparatus as defined in claim 3 in which said secondary valve means comprises a secondary valve chamber formed in said blocking element and having a bleed passage from said secondary chamber also formed therein, and a valve element extending from said one end of said blocking element for selectively controlling flow through said bleed passage.

6. Pressure control apparatus for connecting a supply source of fluid under pressure to a closed system to be pressurized by said supply source and controlling the pressure in the closed system comprising a main valve body having a longitudinally extending chamber formed therein with entry and exit ports for said chamber formed in said body, said entry port being connected to the supply source of pressurized fluid, said exit port being connected to the closed system to receive fluid from the supply source via said entry port, a main valve element disposed for reciprocable movement in said chamber to selectively block and to permit flow from said entry port to said exit port, said main valve element extending out of said chamber and having a conduit formed therein to permit communication between said exit port and an outwardly extending end of said main valve element which is open to the exterior of said main valve body, and secondary valve means connected to control flow in said conduit from said exit port and the closed system to the exterior of said main valve body to selectively reduce pressure at said exit port and in the closed system.

7. Apparatus as defined in claim 6 in which said main valve chamber is substantially cylindrical and in which one of said entry and exit ports is formed at the end of said chamber and is also substantially cylindrical, the diameter of said one port being smaller than the diameter of said chamber, said main valve element having a first substantially cylindrical section adapted to reciprocate into and out of said one chamber end port to block and permit flow and a second substantially cylindrical section adapted to reciprocate in said chamber.

8. Apparatus as defined in claim 7 in which said first section of said valve element carries first sealing means to contact the wall of said chamber end port and block flow therethrough.

9. Apparatus as defined in claim 7 in which the other of said entry and exit ports is formed intermediate the length of said chamber, and in which said second section of said valve element carries second sealing means intermediate said other port and the other end of said chamber to contact the wall of said chamber and prevent leakage.

10. Apparatus as defined in claim 6 which further includes pressure indicating means responsive to pressure in said exit port and the closed system to permit accurate adjustment of said exit port and the system pressure by alternately and by simultaneously selectively reciprocating said main valve element and actuating said secondary valve means.

11. Pressure control apparatus comprising a main valve body having a longitudinally extending chamber formed therein and further having entry and exit ports for said chamber formed in said body, a main valve element disposed for reciprocable movement in said chamber to selectively block and permit flow from said entry port to said exit port, said main valve element extending out of said chamber and having a conduit formed therein to permit communication between said exit port and an outwardly extending end of said main valve element, secondary valve means connected to control flow in said conduit from said exit port to the exterior of said main valve body to selectively reduce pressure at said exit port, said main valve chamber being substantially cylindrical, one of said entry and exit ports being also substantially cylindrical and formed at the end of said chamber, the diameter of said one port being smaller than the diameter of said chamber, said main valve element having a first substantially cylindrical section adapted to reciprocate into and out of said one chamber end port to block and permit flow and a second substantially cylindrical section adapted to reciprocate in said chamber, and a stop member extending inwardly into said main valve chamber, said main valve element having a stop surface formed thereon registering with said stop member and limiting outward travel of said main valve member; said main valve element also having a circumferential groove formed therein spaced from said stop surface to receive said stop member when said main valve element is rotated to prevent reciprocation of said main valve element, said stop member and said circumferential groove being located so that said main valve element is locked in a chamber end port-sealing position.

12. Pressure control apparatus comprising a main valve body having a longitudinally extending chamber formed therein and further having entry and exit ports for said chamber formed in said body, a main valve element disposed for reciprocable movement in said chamber to selectively block and permit flow from said entry port to said exit port, said main valve element extending out of said chamber and having a conduit formed therein to permit communication between said exit port and an outwardly extending end of said main valve element, and secondary valve means connected to control flow in said conduit from said exit port to the exterior of said main valve body to selectively reduce pressure at said exit port, said secondary valve means comprising a secondary valve chamber formed in the outwardly extending end of said main valve element, bleed passage means for said secondary chamber centrally located at the end of said main valve element, and a secondary valve element disposed within said secondary chamber adapted to control flow from said conduit, said secondary valve element having an actuator shaft extending through said bleed passage.

13. Apparatus as defined in claim 12 which further includes biasing means for yieldingly urging said secondary valve element into a flow-blocking position.

14. Apparatus as defined in claim 12 which further includes a knob mounted on said outwardly extending end of said main valve element, said knob having a central opening formed therein, to permit said actuator shaft to extend through, and radially extending flange means to permit finger manipulation of said knob while applying pressure to said actuator shaft.